United States Patent [19]
Papenhagen et al.

[11] Patent Number: 5,868,040
[45] Date of Patent: Feb. 9, 1999

[54] GAS PEDAL WITH FRICTION STRUCTURE

[75] Inventors: Dieter Papenhagen, Waiblingen; Thorsten Meyer, Fellbach, both of Germany

[73] Assignee: Mercedes-Benz AG., Stuttgart, Germany

[21] Appl. No.: 936,586

[22] Filed: Sep. 24, 1997

Related U.S. Application Data

[63] Continuation of Ser. No. 628,943, Apr. 8, 1996, abandoned.

[30] Foreign Application Priority Data

Apr. 20, 1995 [DE] Germany ............ 195 14 5141.0

[51] Int. Cl.⁶ ........................................ G05G 1/14
[52] U.S. Cl. ........................ 74/513; 74/512; 74/560
[58] Field of Search ................ 74/512, 560, 531, 74/575; 188/290, 291, 77 W, 271; 192/12 BA, 57

[56] References Cited

U.S. PATENT DOCUMENTS

| | | | |
|---|---|---|---|
| 4,850,242 | 7/1989 | Hass et al. ............ | 74/512 |
| 4,976,166 | 12/1990 | Davis et al. ............ | 74/512 |
| 5,133,225 | 7/1992 | Lundberg et al. ........ | 74/560 |
| 5,233,882 | 8/1993 | Byram et al. ........... | 4/514 |
| 5,335,563 | 8/1994 | Yamamoto et al. ....... | 74/512 |
| 5,477,746 | 12/1995 | Perisho et al. ......... | 74/516 X |

FOREIGN PATENT DOCUMENTS

| | | | |
|---|---|---|---|
| 1186752 | 2/1965 | Germany ............... | 74/512 |
| 3443897 C2 | 6/1984 | Germany ............... | 74/512 |
| 4300096 A1 | 7/1994 | Germany ............... | 74/512 |
| 4407005 C1 | 3/1995 | Germany ............... | 74/512 |
| 60-239817 | 11/1985 | Japan ................. | 74/512 |
| 63-306957 | 12/1988 | Japan ................. | 74/512 |
| 6-64507 | 3/1994 | Japan ................. | 74/512 |
| 478968 | 1/1938 | United Kingdom ....... | 74/512 |
| 2251289 | 7/1992 | United Kingdom ....... | 74/512 |
| WO 93/12949 | 7/1993 | WIPO ................. | 74/512 |
| WO 94/29584 | 12/1994 | WIPO ................. | 74/512 |

*Primary Examiner*—Vinh T. Luong
*Attorney, Agent, or Firm*—Klaus J. Bach

[57] ABSTRACT

In an arrangement for operating a control device of a vehicle by way of a pedal, a pedal lever is pivotally supported by a bearing bolt mounted on a vehicle structure and is biased by a return spring toward its idle end position. A friction element is provided so as to cooperate with the pedal lever and a friction surface on a stationary structure, the friction element being coupled to the return spring and being arranged to provide friction forces upon movement of the pedal lever, which are dependent on the pedal position and which are higher when the pedal lever is moved in a direction away from the idle end position than they are when the pedal lever is moved in the opposite direction.

4 Claims, 8 Drawing Sheets

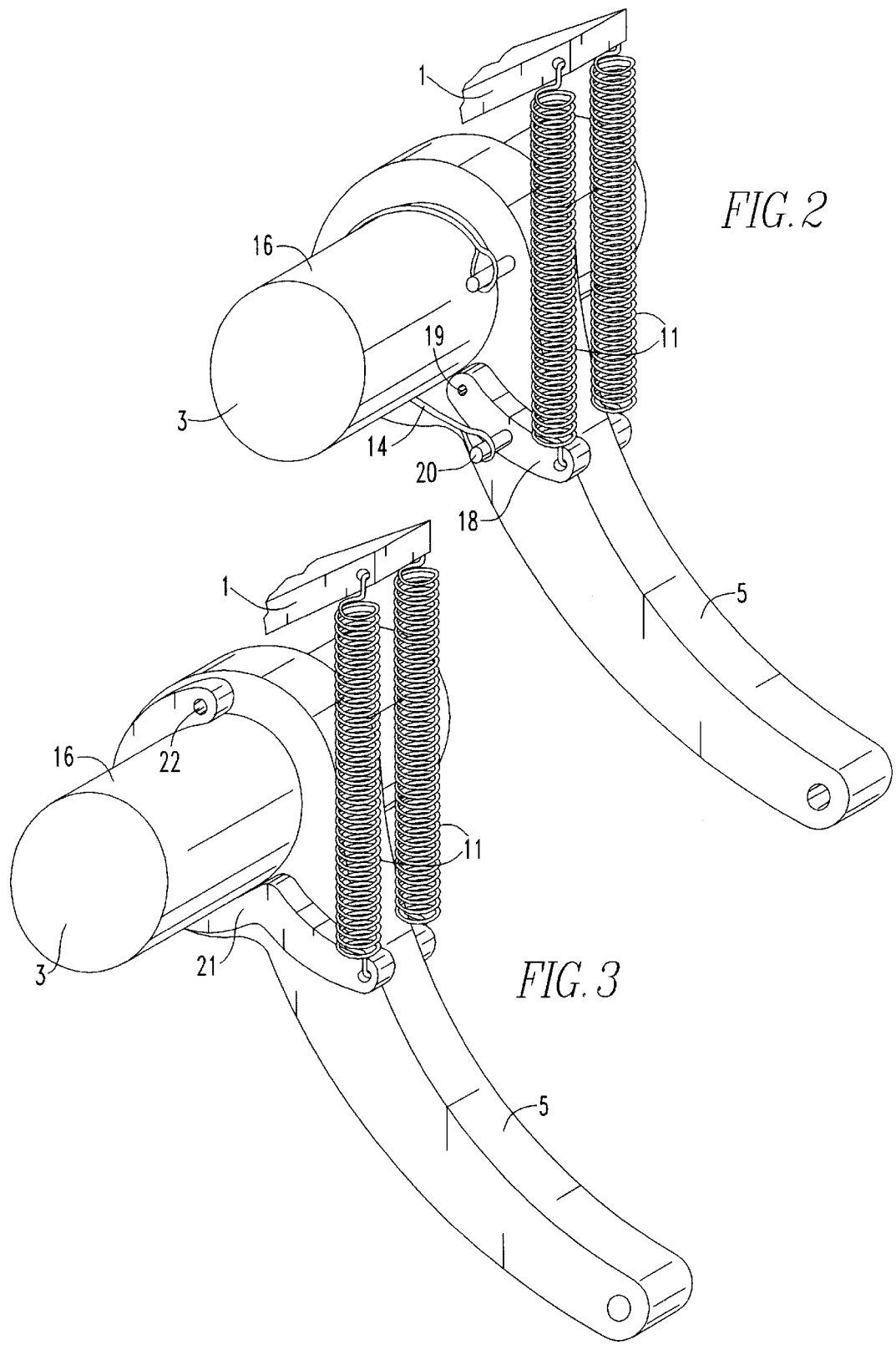

GAS PEDAL WITH FRICTION STRUCTURE

This is a Continuation application of Ser. No. 08/628,943 filed 8 Apr. 96 now abandoned.

The invention relates to an arrangement for operating a control device such as a control member of an internal combustion engine by means of a pedal with a pedal lever which is pivotally supported on a vehicle structure and cooperates with a friction element generating friction forces upon pivoting of the pedal lever.

BACKGROUND OF THE INVENTION

Such an arrangement is basically known from German patent DE 34 43 897 C2 wherein a conical coil spring engages a friction member with a friction surface provided on the bearing of the pedal lever. This provides for a friction moment of a predetermined value when the pedal lever is pivoted in either direction which friction moment provides for a certain force-travel hysteresis curve for the operating linkage of which the pedal lever is part. With the arrangement shown in DE 34 43 897 C2, the force-travel hysteresis with regard to a friction-free movement is the same in both pivot directions.

It is the object of the present invention to provide an arrangement wherein different hysteresis values are obtained for the pivoting movement of the operating lever in opposite directions with a simple and reliably operating structure.

SUMMARY OF THE INVENTION

In an arrangement for operating a control device of a vehicle by way of a pedal, a pedal lever is pivotally supported by a bearing bolt mounted on a vehicle structure and is biased by a return spring in one end position. A friction element is provided so as to cooperate with the pedal lever and a friction surface on a stationary structure, the friction element being coupled to the return spring and being arranged to provide friction forces upon movement of the pedal lever, which are dependent on the pedal position and which are higher when the pedal lever is moved toward an increasing power position than they are when the pedal lever is moved in the opposite direction.

With the arrangement according to the invention the force provided by the return spring of the operating lever is also used for generating a friction moment for providing a force travel hysteresis curve whereby, with respect to a friction free movement, different hysteresis values are achieved in the opposite directions of pivoting movement of the operating lever.

The arrangement is also simple and inexpensive in design since no special spring is needed for generating the friction moments.

Various advantageous embodiments of the invention are defined in the claims and described in detail on the basis of the accompanying drawings.

BRIEF DESCRIPTION OF THE DRAWINGS

FIG. 2 is a perspective view of an arrangement similar to that of FIG. 1 except that the cable is not directly connected to the return spring but via a lever arm, FIG. 3 is a perspective view of an arrangement similar to that of FIG. 1, wherein a pivot lever extends around the bearing bolt so as to provide for a friction structure.

DESCRIPTION OF THE PREFERRED EMBODIMENTS

Figure 1:
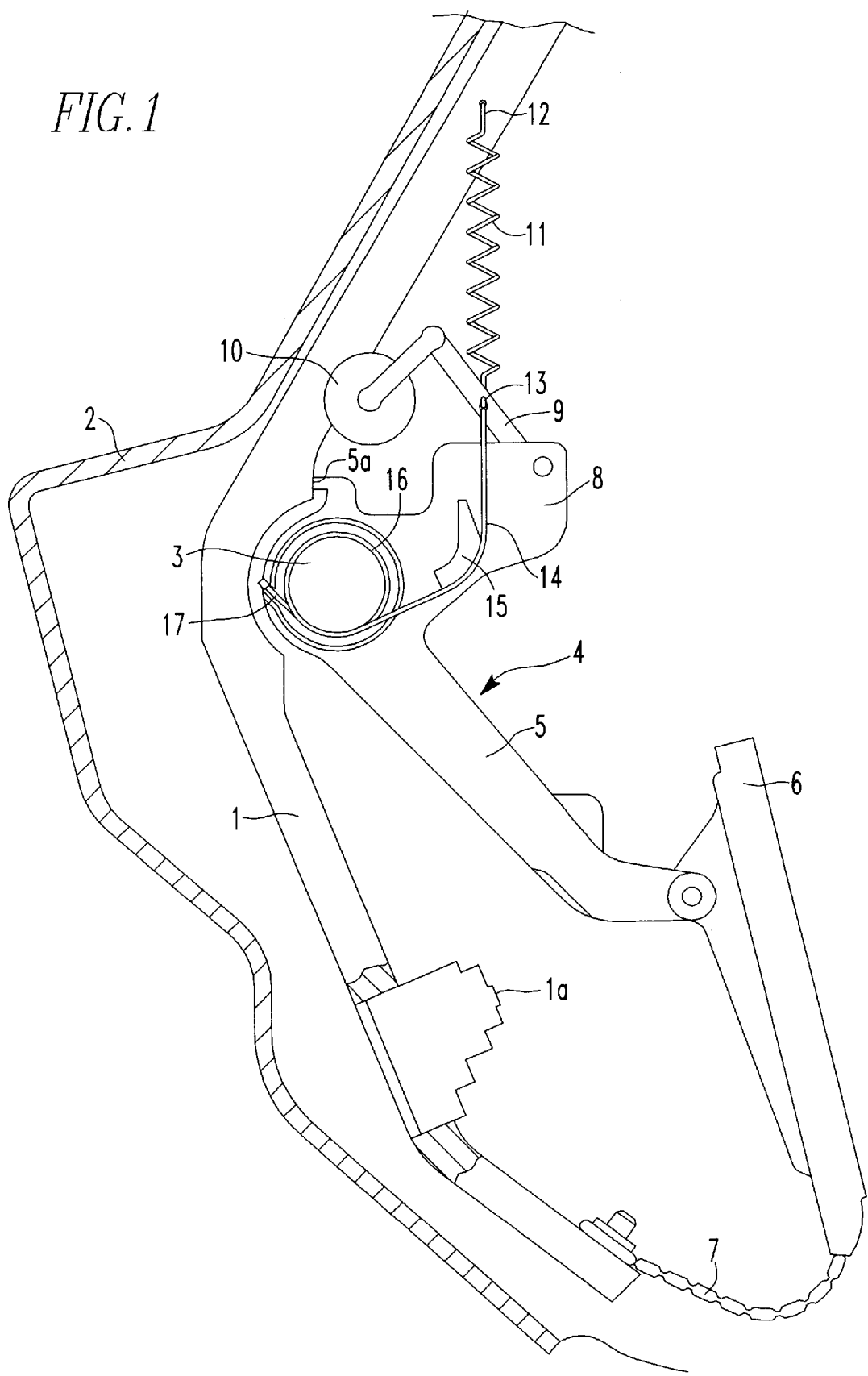
FIG. 1 shows a pedal lever mounted on a bearing bolt in the leg space of a vehicle for operating a control device of an internal combustion engine wherein a cable is wrapped around the bearing bolt so as to serve as a friction structure.

FIG. 1 shows a control device that is a gas pedal for controlling an internal combustion engine. As shown in FIG. 1, a bearing bolt 3 mounted on a support plate 1, which is firmly connected to a mounting structure such as an engine fire wall 2 of a vehicle, has an angled pedal lever 4 pivotally supported thereon. A pedal 6 is hinged to one lever arm 5 of the pedal lever 4 and mounted on the support plate 1 by way of a link coupling strap 7, the other lever arm 8 being connected to link 9 for operating a pedal position sensor 10 which is also mounted on the support plate 1. The pedal position sensor 10 provides, in a known manner, electronic characteristic values to be transmitted to a control member such as the throttle valve of an internal combustion engine.

If the throttle valve is to be operated mechanically, an appropriate mechanical linkage is connected to the lever arm 8.

The pedal lever 4 can be moved from its set idle end position toward when it is in engagement with the support plate at 5a toward full load against the force of a return spring 11 until it reaches its full load end position when the lever 5 engages the stop 1a. As shown in FIG. 1, the return spring 11 has one end 12 connected to the base plate 1 and its other end 13 connected to a cable 14. Between the base plate 1 and the lever arm 8, the spring 11 extends about at a right angle with respect to the lever arm 8. Beginning at the return spring 11, the cable 14 extends to a slide-track 15 on the lever arm 8 around which it is rerouted by an angle of about 90° toward the bearing bolt 3. The cable 14 is wound around the bearing bolt 3 onto a bolt section disposed at the side of the pedal lever, which has a friction surface 16 for the cable forming a friction element, the free end of the cable being fixed by clip 17 to the pedal lever 4.

The cable 14 is so wrapped around the bearing bolt 3 that, upon movement of the pedal lever 4 in the direction of full load, the cable is pulled by the clip 17 into firmer engagement with the friction surface 16. As a result, the force required to move the pedal lever in the direction toward full power is increased which improves the feel for driving. Upon release, that is returning of the pedal lever 11, a return force is applied to the pedal lever 11 by the return spring 11.

FIG. 2 is a perspective view of the arrangement of FIG. 1 wherein however, a lever arm 18 is provided for interconnection of the return spring 11 and the cable 14. It shows also that two return springs 11 and lever arms 18 with cables 14 may be provided, one at each side of the lever arm 5 in order to balance the forces applied to the pedal lever 4. At one end, the lever arm 18 is pivotally mounted to the pedal lever 4 by a bearing pin 19, the other end being engaged by the return spring 11. The cable 14 is mounted onto a mounting pin 20 extending from the lever arm 18 in the center area of the lever arm 18.

FIG. 3 is a perspective view of an arrangement according to the invention wherein the friction member is represented by a pivot lever 21 which extends partially around the bearing bolt 3. At one end, the lever 21 is pivotally supported by a support pin 22 extending from the pedal lever arm 5, the other end being engaged by one end of the return spring 11 whose other end is mounted to a stationary part of the vehicle body, specifically the base plate 1. As in the arrangement shown in FIG. 2, two return springs 11 with associated pivot levers 21, one set at each side of the pedal lever arm 5, may be provided and are shown in FIG. 3 although this is not necessary in accordance with the invention. With the embodiment shown in FIG. 3, the friction forces are also increased when the pedal is moved in the direction of full power.

Figure 4:
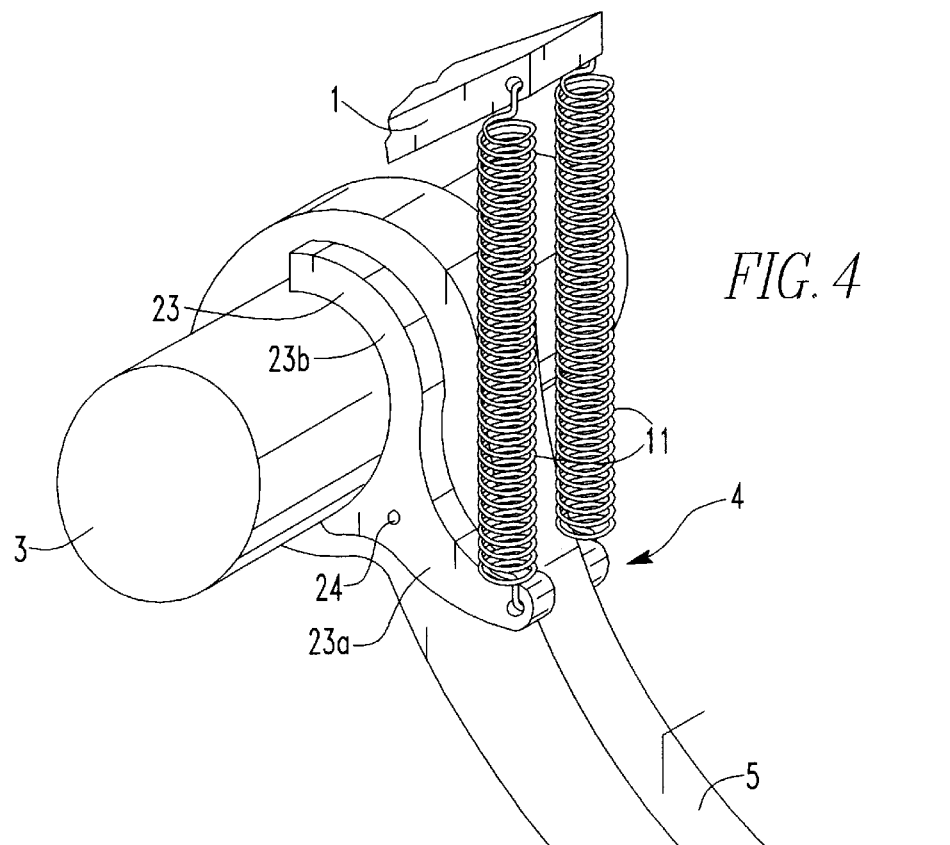
FIG. 4 is a perspective view of an arrangement utilizing a rocker arm as a friction element.

FIG. 4 shows a bearing bolt 3 with a pedal lever 4 carrying a rocker arm 23 as a friction member. There are again two return springs 11 and rocker arms 23. The rocker arm 23 is pivotally supported by a pin 24 and extends partially around the bearing bolt 3. At one end portion 23a of the rocker arm 23, the return spring 11 is engaged in an eyelet formed therein. The desired force hysteresis is obtained by the engagement of the rocker arm portion 23b with the bolt 3 acting like a clamping shoe.

Figure 5:
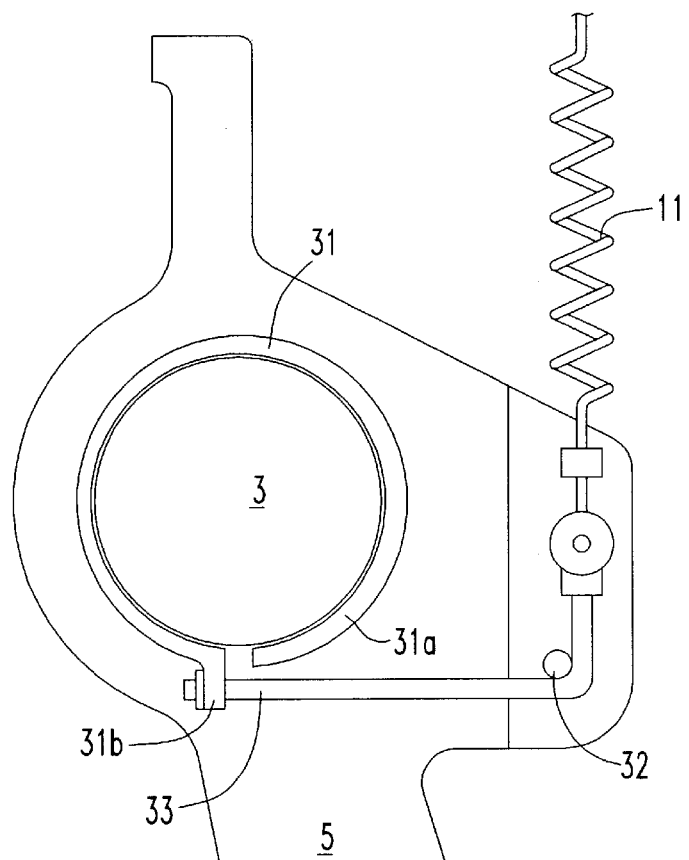
FIG. 5 is a side view of an arrangement including a coil spring portion connected to the return spring as a friction structure.

FIG. 5 shows an embodiment wherein the pedal lever arm 5 which may consist for example of plastic has an opening receiving a bearing bolt 3 and, formed onto the lever arm 5, a slotted friction ring 31. Only the end 31a is connected to the pedal lever arm 5, the rest of the friction ring 31 is disjoined and free to move relative to the pedal lever arm 5.

The free end of the friction ring 31 has an eye 31b wherein the end of a cable 33 is mounted, the cable 33 extending to the return spring 11 via a guide roller 32.

Figure 6:
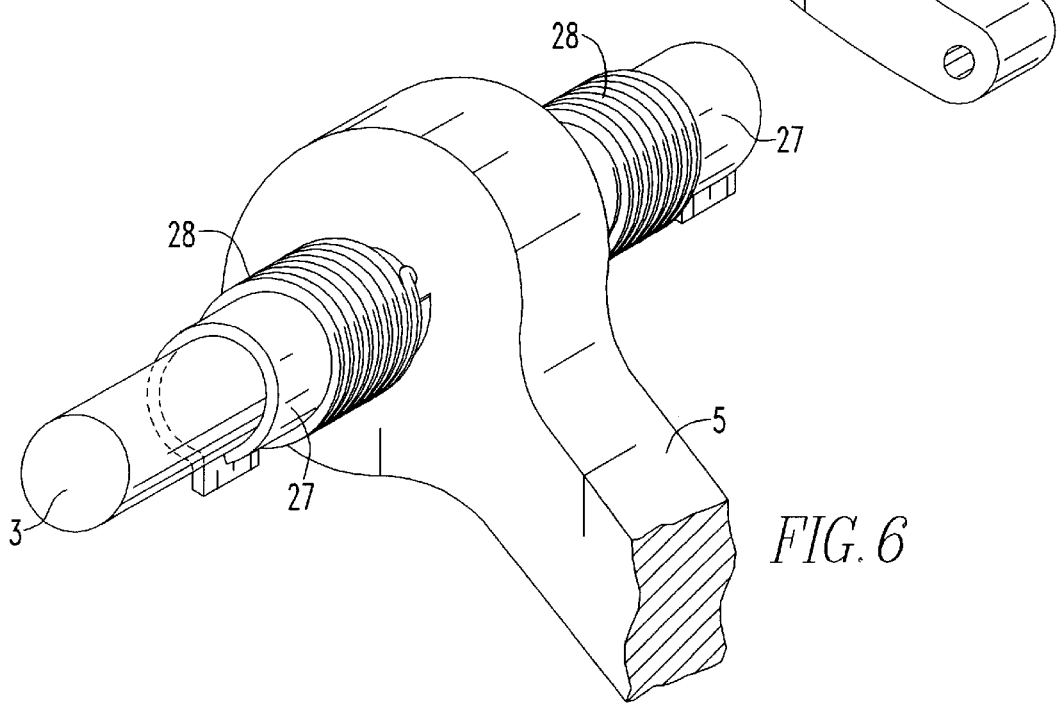
FIG. 6 shows a pedal lever with carrier sleeves on which coil springs are disposed.

FIG. 6 is a perspective view of the pedal lever arm 5 mounted on a bearing bolt 3 and provided with carrier sleeves 27 on which coil springs 28 are disposed.

Figure 7:
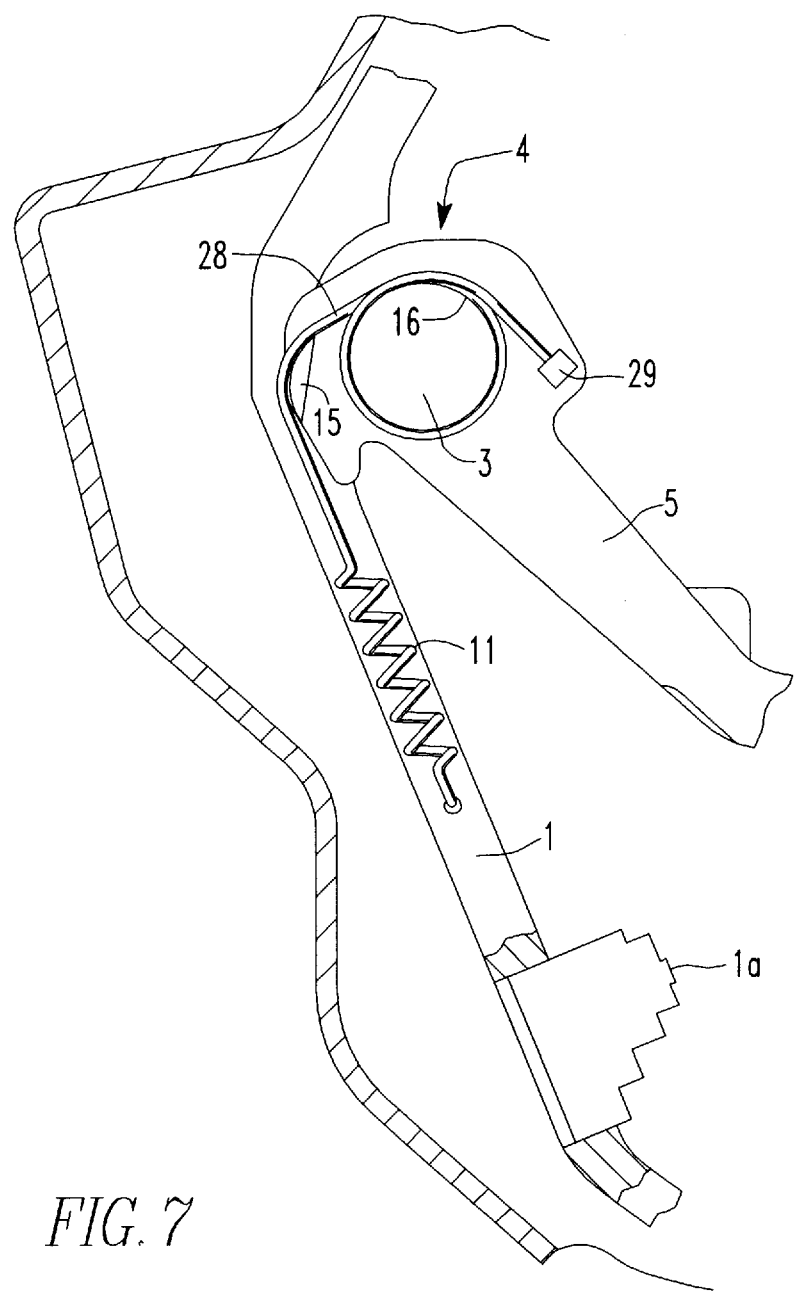
FIG. 7 shows a pedal lever with a friction structure similar to that of FIG. 1 which provides for engagement with a friction surface on the bearing bolt by the forces generated by the return spring.

FIG. 7 shows an arrangement wherein a pedal lever 4 is provided with a steel cable 28 which is wrapped around the lever bearing bolt 3, providing the friction surface 16, and further around the slide track 15 and is connected at one end to the return spring 11. The other end of the cable 28 is connected to the pedal lever arm 5 by means of a cable eyelet 29. As shown, the return spring 11 is hooked in this case, into an eye opening in the support plate 1. The pedal lever 4 can be moved from its idle end position in which it engages the support plate 1 as shown in FIG. 7 toward its full load end position in which the lever arm engages the stop 1a.

Figure 8:
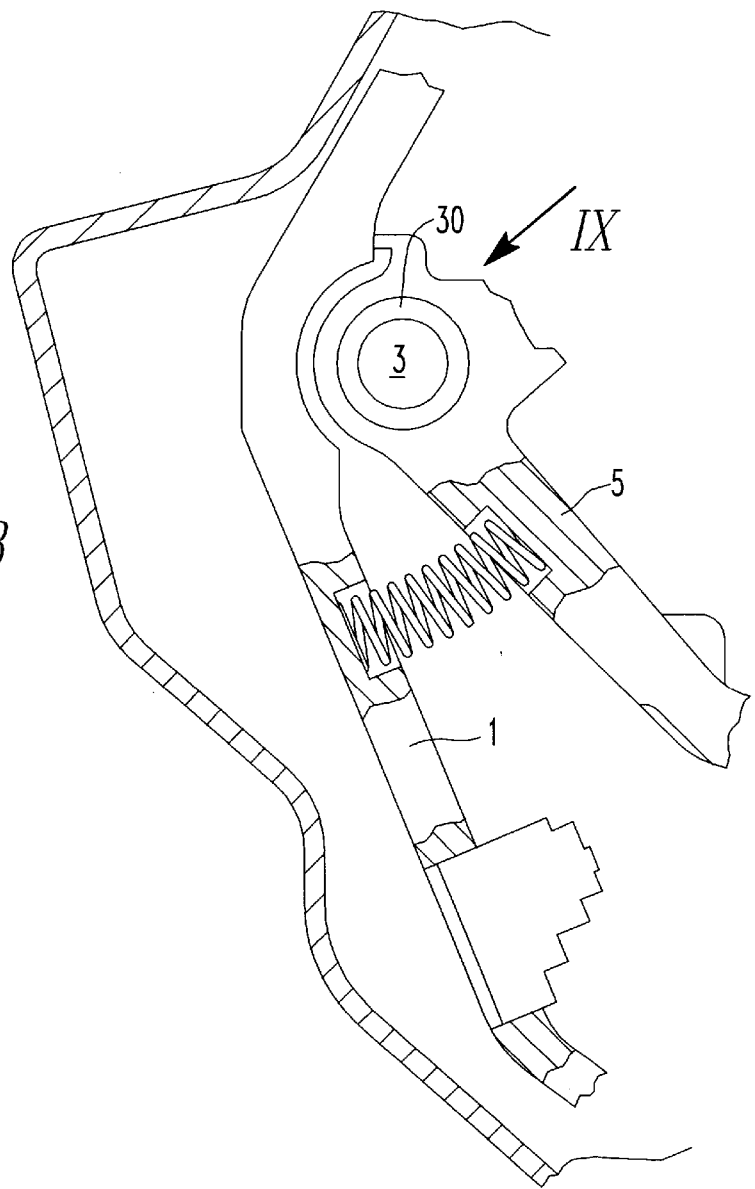
FIG. 8 shows a pedal lever with a coil spring wound onto the bearing bolt.
Figure 9:
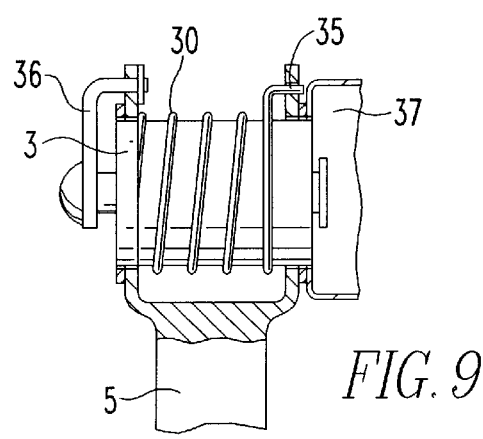
FIG. 9 is a view of the arrangement of FIG. 8 taken in the direction of the arrow IX.

FIGS. 8 and 9 show a pedal lever wherein again, a coil spring 30 is utilized as a friction element. One end 36 of the coil spring 30 is connected to the pedal lever arm 5 which is pivotally supported by the bearing bolt 3. The other end 35 of the coil spring is held by a stationary part 37. In this manner the coil spring is tensioned when the pedal lever 4 is actuated.

Figure 10:
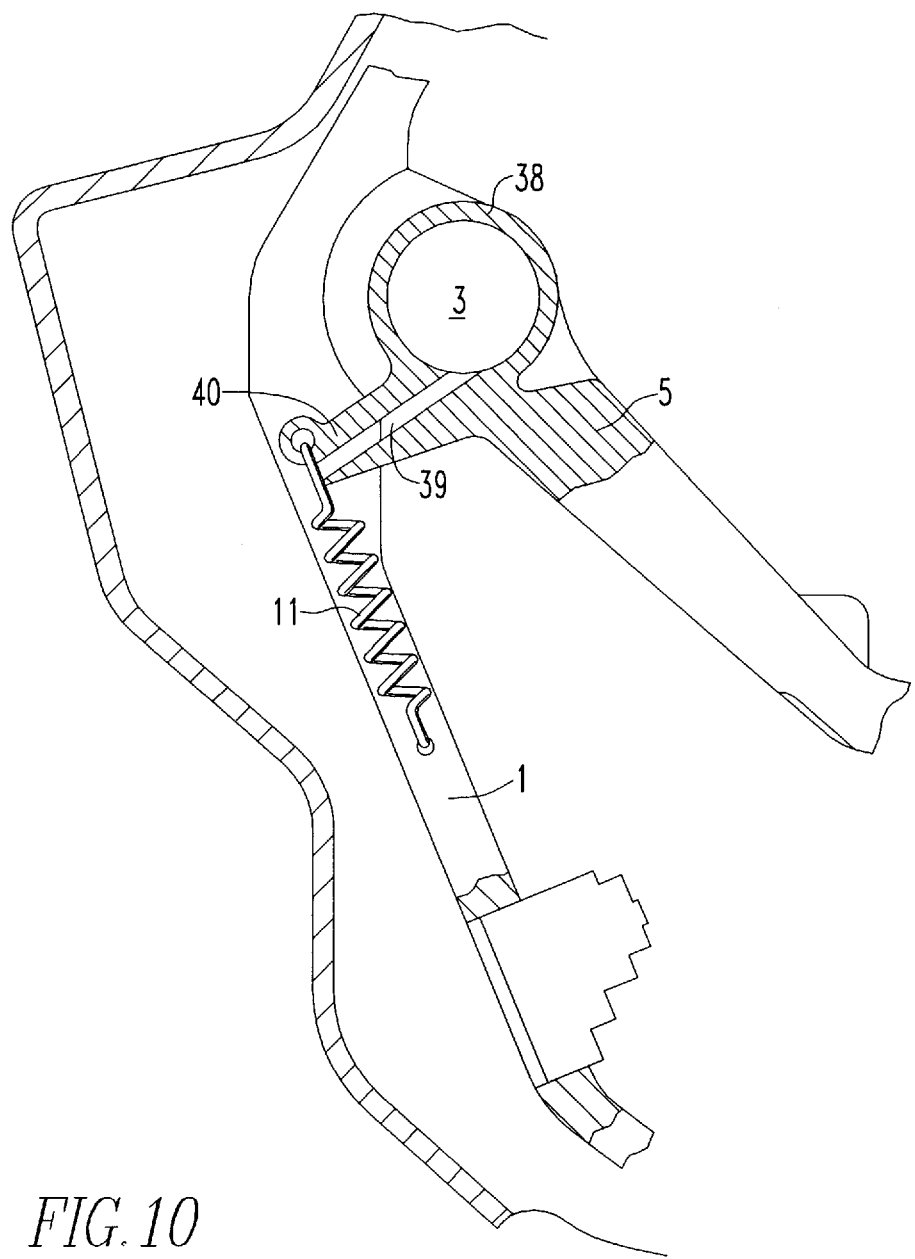
FIG. 10 shows a pedal lever with a slotted support sleeve forming the friction element.

FIG. 10 shows an embodiment of the invention wherein the friction member is formed by the slotted sleeve 38. The slotted sleeve 38 is part of the pedal lever arm 5 or it is firmly connected thereto. The sleeve 38 surrounds the bearing bolt 3. At the slot 39, the sleeve 38 is provided with a lever portion 40 projecting outwardly from the sleeve 38. At its free end the lever portion 40 has an eye into which one end of the spring 11 is hooked, the other end of the spring 11 being hooked into an eye in the base plate 1. In this embodiment, the friction forces are also increased when the lever arm is moved in the direction of increasing power and, as a result of the spring and friction forces, the width of the slot 39 and the size of the opening of the elastic sleeve is decreased whereby the friction between the sleeve 38 and the bearing bolt is increased.

Figure 11:
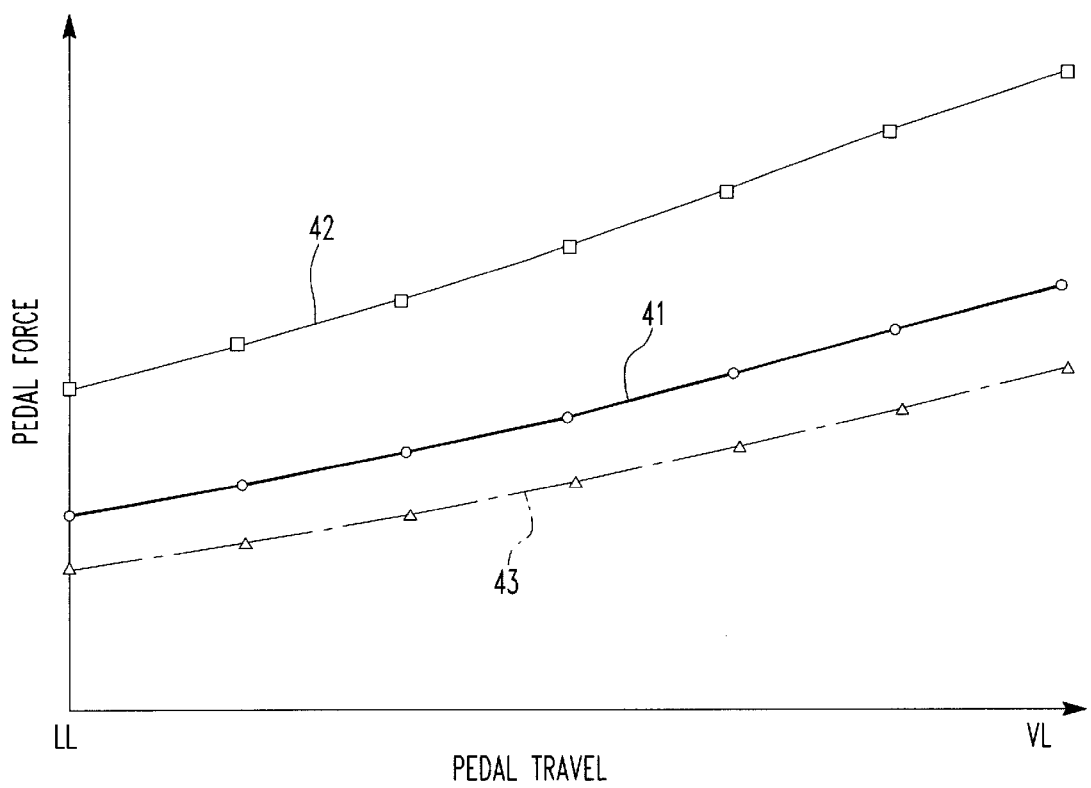
FIG. 11 shows the hysteresis curves in a pedal fore-pedal travel diagram.

The diagram shown in FIG. 11 shows the hysteresis curve achieved with the arrangement according to the invention.

The characteristic curve 41 shows the pedal force dependent on pedal travel between the idle end position LL and the full load end position VL without friction in the linkage.

With the arrangement according to the invention, the pedal force to be applied during movement of the pedal toward its full load position follows curve 42. Its distance from the characteristic curve 41 corresponds to the friction force effective during movement of the pedal toward full load.

Upon return of the pedal lever arm 5 toward its idle end position LL, the pedal force follows line 43. The distance between line 43 and line 41 represents the friction force effective during movement of the pedal toward its idle end position LL. Lines 42 and 41 represent the hysteresis curve for the lever arrangement according to the invention.

It can be seen that, with increasing pedal travel, the total hysteresis (distance between curve 42 and 43) also increases. This is the result of increased friction forces as the return springs are increasingly tensioned as they also provide the engagement forces for the friction members.

What is claimed is:

1. A foot pedal arrangement for operating a control device for controlling a vehicle internal combustion engine, said arrangement comprising a pedal lever supported on a stationary support plate including a bearing bolt supporting said pedal lever so as to be pivotable about a pivot axis between idle and full load end positions, a return spring engaging said pedal lever so as to bias said pedal lever toward its idle end position and a cable having one end connected to said pedal lever and extending around a slide track disposed on said pedal lever in spaced relationship from said pivot axis and also around at least a portion of said stationary support plate and having a friction surface in contact with said stationary support plate to provide, upon movement of said pedal lever, a friction force which is dependent on the pedal position and the pivot direction of said pedal lever.

2. An arrangement according to claim 1, wherein said friction surface is provided on said bearing bolt.

3. An arrangement according to claim 1, wherein said cable extends at least partially around said bearing bolt.

4. An arrangement according to claim 2, wherein said cable extends in a loop around said bearing bolt and has one end connected to said pedal lever and its other end connected to said stationary mounting structure by way of said return spring.

\* \* \* \* \*